United States Patent [19]
Kubodera

[11] 3,800,433
[45] Apr. 2, 1974

[54] DRYING AND CURING APPARATUS

[76] Inventor: Hisayoshi Kubodera, 19-10, 2-chome, Shinbashi, Minato-ku, Tokyo-To, Japan

[22] Filed: May 4, 1972

[21] Appl. No.: 250,350

[52] U.S. Cl. .................................. 34/155, 34/77
[51] Int. Cl. ........................................ F26b 13/06
[58] Field of Search ............ 34/161, 159, 155, 152, 34/151, 148, 77, 27, 23

[56] References Cited
UNITED STATES PATENTS

| | | | |
|---|---|---|---|
| 3,510,960 | 5/1970 | Kubodera | 34/155 |
| 3,231,985 | 2/1966 | Smith, Jr. | 34/148 |
| 3,183,604 | 5/1965 | Stauffer | 34/155 |
| 3,087,254 | 4/1963 | Kubodera | 34/159 |
| 2,174,170 | 9/1939 | Schweizer | 34/23 |
| 2,039,176 | 4/1936 | Locker | 34/159 |
| 1,562,764 | 11/1925 | Harris | 34/27 |

FOREIGN PATENTS OR APPLICATIONS

| | | | |
|---|---|---|---|
| 1,109,686 | 4/1968 | Great Britain | 34/155 |
| 851,543 | 1/1940 | France | 34/161 |

Primary Examiner—William F. O'Dea
Assistant Examiner—Paul Devinsky
Attorney, Agent, or Firm—Wenderoth, Lind & Ponack

[57] ABSTRACT

An apparatus for drying and curing a plastic resin dissolved in a solvent and applied on an elongated sheet material such as paper or fabric essentially comprises two vertical, inverted U-shaped heating chambers through which the elongated sheet material is advanced, the first heating chamber being provided with an air circulating path and a solvent recovering chamber, while the second heating chamber is provided with means for supplying fresh air of a far smaller amount than that of the air circulated in the first heating chamber, and means for exhausting air, while the temperature in the second heating chamber is kept considerably higher than that of the first heating chamber.

2 Claims, 1 Drawing Figure

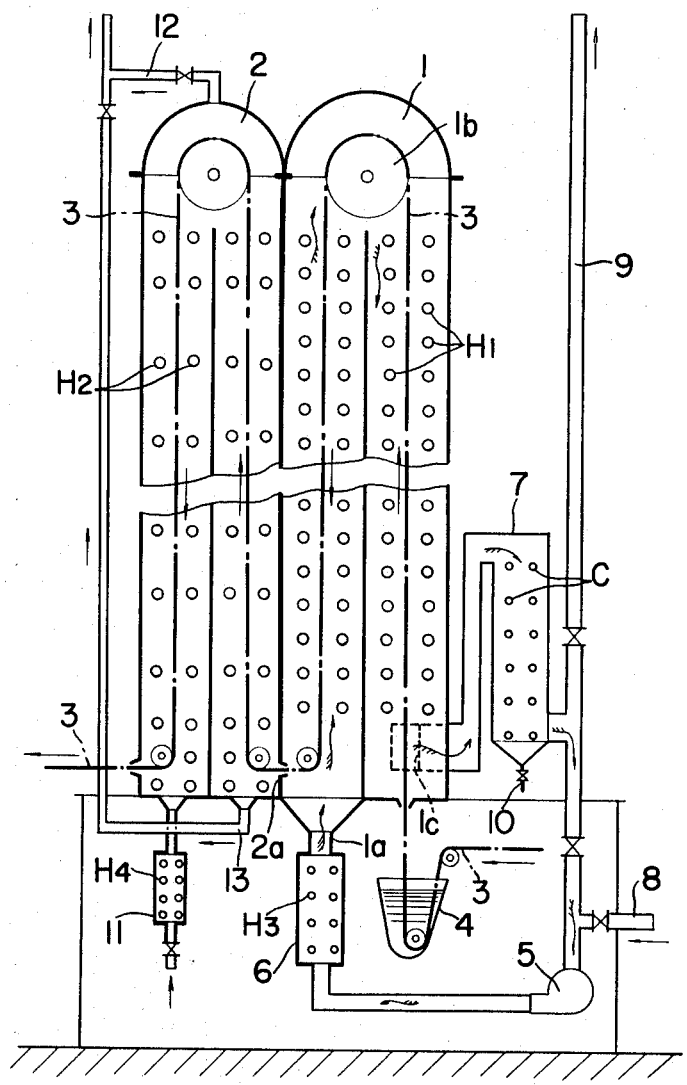

DRYING AND CURING APPARATUS

BACKGROUND OF THE INVENTION

This invention relates generally to apparatus for drying, ageing, curing, maturing, ripening, and so on.

More particularly, the invention relates to a new and improved apparatus suitable for drying, ageing or curing a resin and the like dissolved in a solvent and applied on a long sheet material or strip.

Heretofore, a drying machine having a vertically set up inverted U-shaped heating chamber and a device coupled to an air exhausting end of the heating chamber for recovering the solvent and recirculating the solvent free air into the heating chamber has been known.

However, requirements for the products processed in such a known drying machine, for instance, laminated plates made of phenol resin, epoxide resin, and the like are recently becoming increasingly strict. When these laminated plates during the processes are dried, aged, cured, or matured (hereinafter simply referred to as dried and cured), there has been experienced a tendency of impurities which would exist in the plastic resin and the like to evaporate and be carried by the air, and thereafter deposited or absorbed in the laminated layers of the laminated plates, thereby causing deterioration of the electrical characteristics and mechanical properties of the laiminated plates.

In order to eliminate the above described drawback of the known apparatus, an attempt has been made to improve the capacity of the solvent recovering device attached to the air exhausting end of the heating chamber so that the impurities can thereby be removed from the circulating air. However, this complicates the construction and operation of the drying machine, and yet spontaneous absorption or deposition of the impurities in the laminated layers cannot be completely eliminated. Of course, if the air carrying the evaporated solvent is exhausted in the outer atmosphere, no harmful effect caused by the impurities will be found in the laminated plates. However, the solvent recovery rate is thereby lowered, and the problem of air pollution is thereby introduced.

SUMMARY OF THE INVENTION

An object of the present invention is to provide an apparatus for drying and curing plastic materials forming laminated layers, wherein all of the above-mentioned drawbacks of the conventional apparatus are substantially overcome.

A specific object of the invention is to provide a drying and curing apparatus wherein contamination of the products due to the impurities carried by the circulating air is totally eliminated.

Still another object of the invention is to provide a drying and curing apparatus wherein any possibility of causing air pollution can be completely eliminated.

An additional object of the invention is to provide a drying and curing apparatus wherein complication of the construction and processes can be avoided.

These and other objects of the present invention can be achieved by an apparatus for drying and curing a plastic or any other resin dissolved in a solvent and applied on an elongated sheet material such as paper or fabric, which apparatus comprises a heating chamber vertically erected in an inverted U-shaped configuration, through which the elongated sheet material is guided from one end to the other end, with air circulated in a direction counter to that in which the material travels, and means coupled to the air exhausing end of the heating chamber for recovering the solvent and recirculating the air through the heating chamber, and which, according to the present invention, further comprises a second heating chamber also of a vertically erected, inverted U-shaped configuration, communicatively coupled to the material delivering end of the first heating chamber, wherein the material delivered from the first heating chamber is passed upward and then downward to be delivered from a delivery end of the second heating chamber, means for supplying a comparatively smaller amount of fresh air than for the first heating chamber at a position near the material delivering end of the second chamber, and means for exhausting a quantity of air corresponding to the supplied quantity thereof from a suitable position of the second heating chamber to the outer atmosphere.

The nature, principle, and the utility of the present invention will be more clearly understood from the following detailed description of the invention when read in conjunction with the accompanying drawing.

BRIEF DESCRIPTION OF THE DRAWING

The single FIGURE of the accompanying drawing is a schematic side elevation, in vertical section, showing the essential parts and organization of one example of a drying and curing apparatus according to the present invention.

DETAILED DESCRIPTION

Referring now to the drawing, there is illustrated an apparatus according to the present invention for drying and curing a plastic resin solution applied on a long sheet material, such as paper or fabric. The principal components of the apparatus are a first heating chamber 1 and a second heating chamber 2, both having an inverted U-shaped construction.

In the heating chambers 1 and 2, suitable numbers of heating elements $H_1$ and $H_2$ such as pipes through which steam flows are provided, respectively. A long sheet material 3 such as a paper or a fabric is passed through a dipping tank 4 filled with a plastic resin solution. The material 3 thus passed through the dipping tank 4 is thereafter introduced into the first heating chamber 1, and is guided upward and then downward between the heating elements $H_1$.

In the first heating chamber 1, air is circulated in a direction counter to that of the material 3. To this end, air supplied by an air circulating blower 5 and preheated in a preheating chamber 6 having heating pipes $H_3$ therein is introduced through a lower opening 1a of the heating chamber 1, flows through the interior of the chamber and leaves the same through an outlet opening 1c. The air is then passed through a cooling chamber 7 provided with a suitable number of cooling elements C which may be pipes through which cooling medium flows.

By these process steps, the solvent of the plastic resin solution deposited on the material 3 can be substantially dried out, and the vapor of the solvent carried by the air is cooled and liquefied in the cooling chamber 7. The air thus separated from the solvent is thereafter sent back to the air preheating chamber 6 by means of the air circulating blower 5. The solvent collected in the cooling chamber 7 is removed therefrom through a valve 10 and may be reused for suitable purposes.

In an air duct extending between the cooling chamber 7 and the air circulating blower 5, an air exhausting pipe 9 and a fresh air supplying pipe 8 are connected as indicated in the drawing.

In the second heating chamber 2 of substantially similar construction as that of the first heating chamber 1, the material 3 is introduced through an inlet slot 2a positioned closely adjacent to the material delivering slot of the first heating chamber 1. Since the materail 3 has been dried out almost completely in the first heating chamber 1, it is supplementally dried out and cured in the second heating chamber 2 in the presence of fresh air which is supplied into the chamber 2 through a preheating chamber 11 having heating pipes $H_4$ therein. The second heating chamber 2 is maintained at a temperature higher than that of the heating chamber 1, and the required quantity of air in this chamber 2 is much less than in the first chamber 1.

It should be noted that air exhausting pipes 12 and 13 are connected to the second heating chamber 2 for exhausting air from the top and bottom of the heating chamber, respectively. Whenever water is produced during the polymerization of the plastic resins, the upper exhausting pipe 12 is employed for exhausting air corresponding to the amount introduced through the preheating chamber 11, and whenever the vapor of the solvent is heavier than the air, the lower exhausting pipe 13 is employed for the same purpose.

In most of the cases where a plastic resin, such as phenol resin, epoxide resin, or the like, dissolved in a solvent and applied on a material such as paper or cloth is dried out, the phenol resin, epoxide resin, or the like is also polymerized while the solvent is dried out. For this polymerization or curing of the plastic resin, a higher temperature than that required for the evaporation of the solvent is required.

For instance, in the case where a phenol resin is dissolved in methanol employed as a solvent, the methanol has a boiling point of about 65°C, whereas the polymerization or curing of the phenol resin requires a temperature of from 150° to 190°C, or more.

According to the present invention, the polymerization or curing process and a supplemental drying process are carried out in the second heating chamber at the above-mentioned higher temperature under a substantially closed condition of the heating chamber with a far smaller quantity of fresh air supply.

Because of the above described features of the present invention, that is, the separation of the entire drying and curing process in the conventional practice into two parts, one being circulated by a greater quantity of air at a lower temperature, and the other being supplied with a small quantity of fresh air (under almost a closed condition of the heating chamber) at a higher temperature, the aforementioned drawback of the known apparatus, i.e., the deterioration of the electrical and mechanical characteristics of the products due to the absorption of impurities, due to the intervention of the air, can be substantially eliminated.

Furthermore, the polymerization, condensation, or curing of plastic resins is ordinarily accompanied by the generation of a small amount of heat, and since the second heating chamber according to the present invention is maintained in a substantially closed state with an extremely limited amount of the fresh air supply, the heat consumption of the chamber is greatly economized.

Because of the above described construction of the drying and curing apparatus of the present invention, the temperature distribution in the polymerizing chamber (second heating chamber) can be improved greatly over that of the conventional apparatus, and the polymerizing or curing process can be made more rational than that in the latter. In the first heating chamber of the present invention, the temperature can be set at the most pertinent value for the evaporation of the solvent, i.e., at a temperature of a considerably lower value, whereby the heat consumption in the first heating chamber can be economized and the best evaporating condition of the solvent can be achieved.

Furthermore, the initial cost required for the provision of the second heating chamber can be reduced to about 20 percent of the total cost for the apparatus because of the limited amount of heating, low flow rate of the air, and facility of heat insulation, while the capacity of the apparatus of this invention is multiplied by two or more times relative to that of the conventional apparatus. In addition to the above described advantageous features, the economization of the power consumption and labor, improvement in the quality of the products, facility in recovery of the solvent, and full prevention of air pollution can be achieved by the present apparatus. I claim:

1. In an apparatus for drying and curing a plastic resin and the like applied in a dissolved state in a solvent onto a long sheet material such as paper or fabric, comprising a vertically extending heating chamber having an inverted U-shaped configuration and having at its lowermost parts an inlet and an outlet, means for moving the material through said heating chamber from said inlet to said outlet, means for circulating heated air through said chamber from a location adjacent said outlet to a location adjacent said inlet in the direction counter to that of the material travel, and means connected to said chamber at said location adjacent said inlet for exhausting the air from within the chamber to recover the solvent and for recirculating the air to said location adjacent the outlet into the chamber; the improvement comprising, a second heating chamber having a vertically extending and inverted U-shaped configuration and operating at a temperature higher than that in the first heating chamber, said second chamber having at one of its lowermost parts an inlet communicatively connected to said outlet of said first heating chamber and at the other lowermost part an outlet, means operatively associated with said second heating chamber for moving the material which has passed through said first heating chamber through said inlet of the second heating chamber into the same and passing it upwardly and then downwardly through the second chamber to deliver it through said outlet of the second chamber means for supplying a much smaller quantity of heated air and at a higher temperature than in the first heating chamber from a location adjacent said outlet of the second chamber into the second chamber and for causing the air to flow in the direction counter to that of the material travel in the second chamber, and means operatively connected to said second chamber for exhausting the quantity of air supplied into the second chamber through a location adjacent said inlet of the second chamber without recirculating the air into the second chamber.

2. Apparatus as set forth in claim 1 further including means operatively connected to said second chamber for exhausting air in the second chamber from the top thereof.

* * * * *